US011332205B2

(12) United States Patent
Hwang et al.

(10) Patent No.: US 11,332,205 B2
(45) Date of Patent: May 17, 2022

(54) PIN JOINT TRAILER SHIM SYSTEM

(71) Applicant: Brandt Industries Inc., Regina (CA)

(72) Inventors: Hyunjin Hwang, Regina (CA); Brett Burke, Edmonton (CA); Raymond Strelic, Regina (CA)

(73) Assignee: Brandt Industries Inc., Regina (CA)

( * ) Notice: Subject to any disclaimer, the term of this patent is extended or adjusted under 35 U.S.C. 154(b) by 389 days.

(21) Appl. No.: 16/718,778

(22) Filed: Dec. 18, 2019

(65) Prior Publication Data

US 2021/0179207 A1 Jun. 17, 2021

(30) Foreign Application Priority Data

Dec. 13, 2019 (CA) ................................ CA 3065014

(51) Int. Cl.
*B62D 53/06* (2006.01)
*B62D 21/12* (2006.01)
*B62D 21/20* (2006.01)

(52) U.S. Cl.
CPC .......... *B62D 53/061* (2013.01); *B62D 21/12* (2013.01); *B62D 21/20* (2013.01); *B62D 53/062* (2013.01); *B62D 53/065* (2013.01)

(58) Field of Classification Search
CPC ....... B62D 53/061; B62D 21/12; B62D 21/20
See application file for complete search history.

(56) References Cited

U.S. PATENT DOCUMENTS

| 5,067,741 | A | * | 11/1991 | Ayme | ................... | B62D 53/061 |
| | | | | | | 280/476.1 |
| 5,435,586 | A | * | 7/1995 | Smith | ................... | B62D 53/061 |
| | | | | | | 280/425.2 |
| 6,932,372 | B2 | * | 8/2005 | French | ................. | B62D 53/065 |
| | | | | | | 280/425.2 |
| 2018/0244321 | A1 | * | 8/2018 | McCloud | ............. | B62D 33/046 |

OTHER PUBLICATIONS

E.D. Etnyre & Co., Blackhawk, RTN Series Trailer Parts Manual, MP-RTN-031R1, Stinger Assembly—Blackhawk Common Parts excerpt, downloaded Nov. 2017, from https://www.etnyre.com/wp-content/uploads/2017/01/MP-RTN-03R1.pdf, pp. 1 & 60, 3 pgs. [Date of publication unknown].

(Continued)

*Primary Examiner* — Kevin Hurley
*Assistant Examiner* — Marlon A Arce
(74) *Attorney, Agent, or Firm* — Frost Brown Todd LLC; Nicole M. Tepe

(57) ABSTRACT

A trailer having a hitch assembly, a deck assembly, an axle assembly and a structural joint positioned between the deck assembly and the axle assembly is provided. The deck assembly having a first support beams and a second support beams supporting decking. The first support beam and the second support beam can have a positive camber. At least one shim plate can be rotatable between a joint position, wherein the at least one shim plate is positioned in the structural joint, and a storage position, wherein the at least one shim plate is rotated out of the structural joint to adjust the amount of camber in the support beams.

22 Claims, 6 Drawing Sheets

(56) References Cited

OTHER PUBLICATIONS

Fontaine Heavy-Haul Owner's Guide, Shim Points and Applications excerpt, downloaded Feb. 2018, from https://fontaineheavyhaul.com/pdfs/OwnersGuide.pdf, pp. 56-57, 3 pgs. [Date of Publication unknown].
Fontaine Heavy-Haul, YouTube video, Shim Modular Bogie, Jul. 19, 2012, downloaded Jun. 2, 2020 from https://www.youtube.com/watch?v=6jv31IEFMj8, 1 pg. [Video submitted upon request].
Photograph of an Aspen Trailer, manufactured Oct. 2017, and photograph taken Nov. 2017, 1 pg.

* cited by examiner

PIN JOINT TRAILER SHIM SYSTEM

CROSS-REFERENCE TO RELATED APPLICATION

This application claims priority to and benefit of CA Serial No. 3,065,014, filed Dec. 13, 2019, entitled "Pin Joint Trailer Shim System," the contents of which are incorporated by reference in its entirety for all purposes.

FIELD OF THE INVENTION

The present invention relates to heavy haul trailers that use cambered support beams to increase their load carrying capacity and more particularly to a system and method of spacers to adjust the amount of camber in the support beams.

BACKGROUND

"Heavy haul" trailers are designed to haul very heavy loads, such as heavy construction equipment. It is common for some of these trailers to use "cambered" support beams in order to counter deflection under load without needing to increase the stiffness of the support beams. Instead of increasing the size of the support beams that carry the load on the trailer, the support beams are cambered or arched upwards to allow the support beams to deflect more under load before they are deflected flat. As load is supported by the support beams, the support beams deflect downwards towards being straight or flat. Generally, the more the support beams are cambered or arched, the heavier the load that can be placed on the trailer before the support beams deflect flat.

Some of these heavy haul trailers with cambered support beams contain structural joints along the length of the vehicle that allow for adjustments to the overall camber, or arch of the trailer. These trailers can be adjusted for differences in deflection from their unloaded to loaded states to adjust for different payloads. One typical structural joint design is a bottom mounted pin joint with the top opening being filled with various thicknesses of "shim" plates to adjust the camber. However, these shim plates are typically loose plates that are stored elsewhere on the trailer or in the tow vehicle when they are not used in the structural joint.

BRIEF SUMMARY

A trailer is provided that includes a hitch assembly connectable to a tow vehicle, a deck assembly, an axle assembly and a structural joint. The deck assembly having a first support beams, a front end of the first support beam attached to the hitch assembly, and a rear end of the first support beam connected to a structural joint, a second support beam, a front end of the second support beam attached to the hitch assembly, and a rear end of the second support beam connected to a structural joint, and decking attached to the first support beam and the second support beam. The first support beam and the second support beam have a positive camber. The axle assembly has at least one axle and wheels provided on the at least one axle. The structural joint is a structural joint positioned between the deck assembly and the axle assembly. At least one shim plate can be rotatable between a joint position, wherein the at least one shim plate is positioned in the structural joint, and a storage position, wherein the at least one shim plate is rotated out of the structural joint to adjust the amount of camber in the support beams.

BRIEF DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
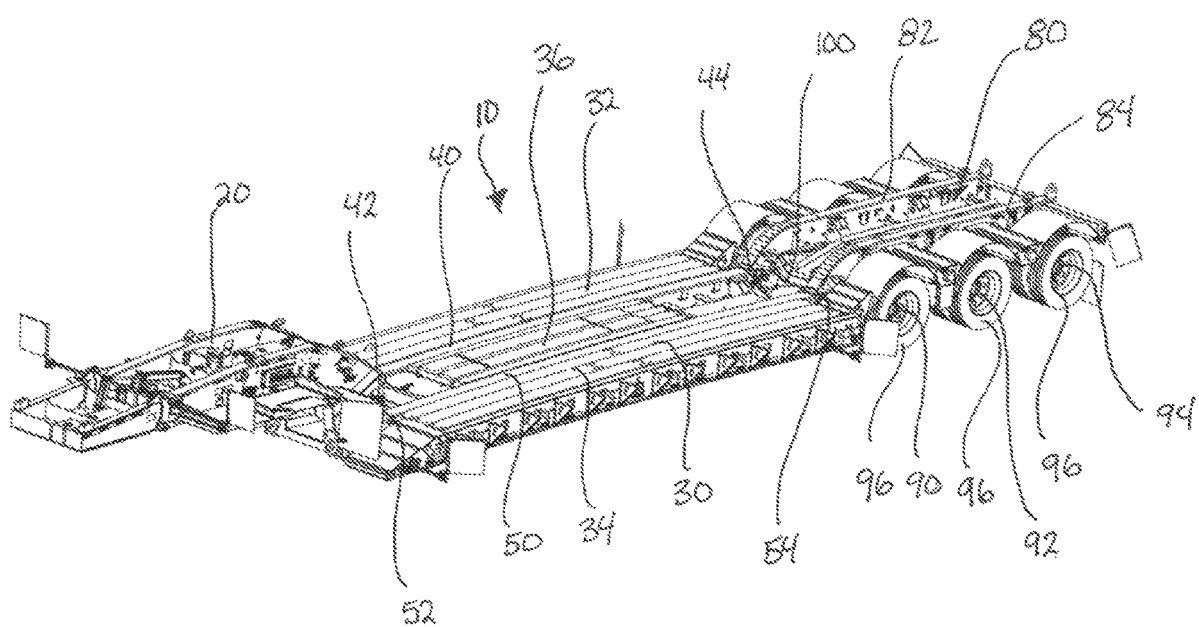
FIG. 1 is a perspective view of a trailer with cambered support beams.

FIG. 1 illustrates a trailer 10 for hauling heavy articles, like heavy equipment. The trailer 10 can have a hitch assembly 20, a deck assembly 30, an axle assembly 80 having axles 90, 92, 94 supporting wheels 96.

The hitch assembly 20 can be used to connect the trailer 10 to a tow vehicle, such as a tractor unit (not shown), to allow the trailer 10 to be pulled by the tow vehicle. In one aspect, the hitch assembly 20 can be a goose neck.

The deck assembly 30 is positioned behind and connected to the hitch assembly 20 and is used to carry a load on the trailer 10. The deck assembly 30 can comprise a pair of parallel support beams 40, 50. A first support beam 40 can attach at a front end 42 of the first support beam 40 to the hitch assembly 20 and a second support beam 50 can attach at a front end 52 of the second support beam 50 to the hitch assembly 20.

The first support beam 40 can extend backwards from the front end 42 of the first support beam 40 to a rear end 44 of the first support beam 40. The second support beam 50 can extend backwards from the front end 52 of the second support beam 50 to a rear end 54 of the second support beam 50.

Decking 32, 34, 36 can be provided attached to and supported by the first support beam 40 and second support beam 50 to suspend the load on top of the decking 32, 34, 36. In one aspect, there could be first outboard decking 32 suspended from and outboard of the first support beam 40 and second outboard decking 34 suspended from and outboard of the second support beam 50, respectively. Middle decking 36 can be suspended between the first support beam 40 and the second support beam 50.

Figure 2:
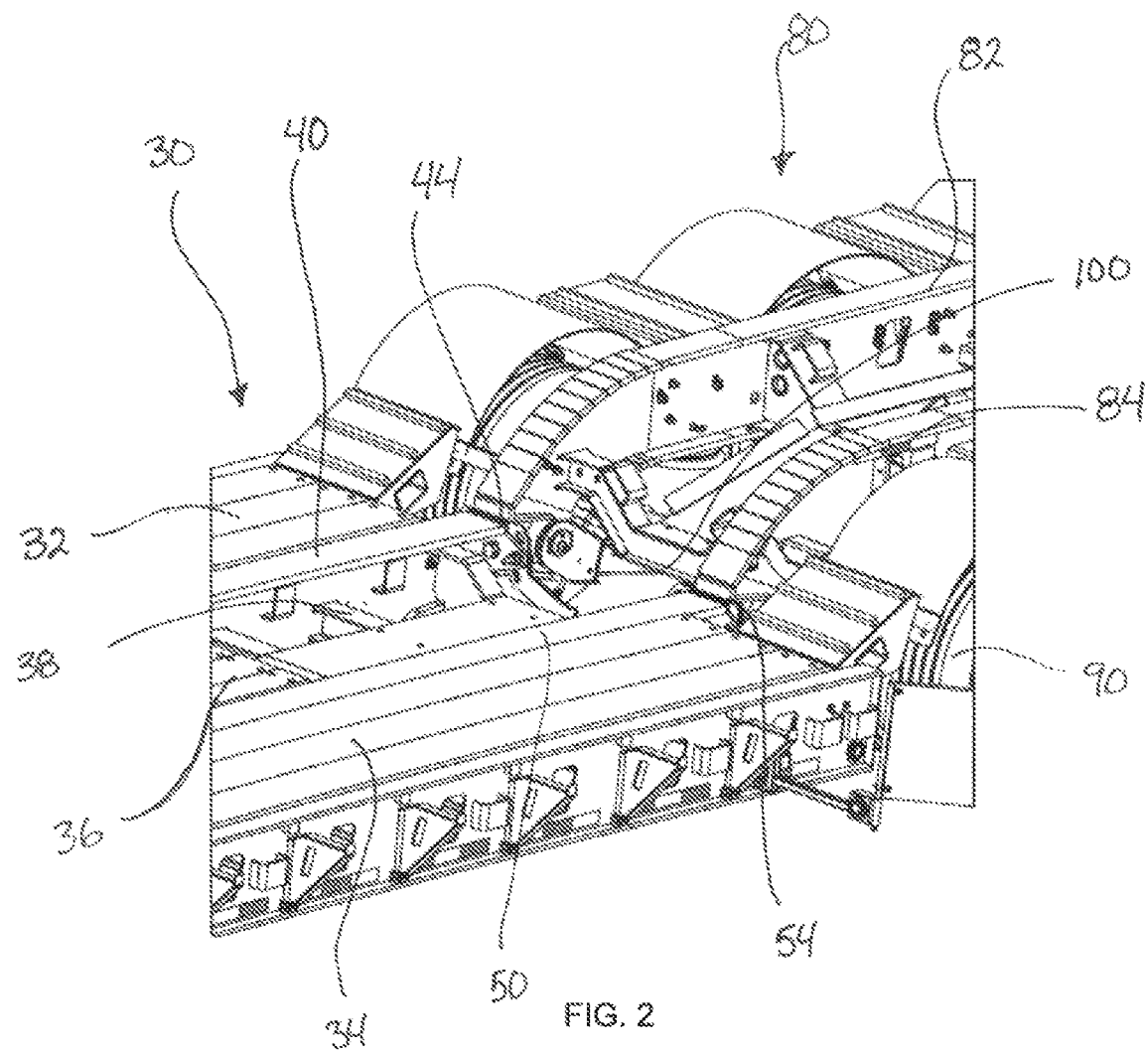
FIG. 2 is a close-up view of a structural joint on the trailer, shown in FIG. 1, that allows the camber in a deck assembly to be adjusted.
Figure 3:
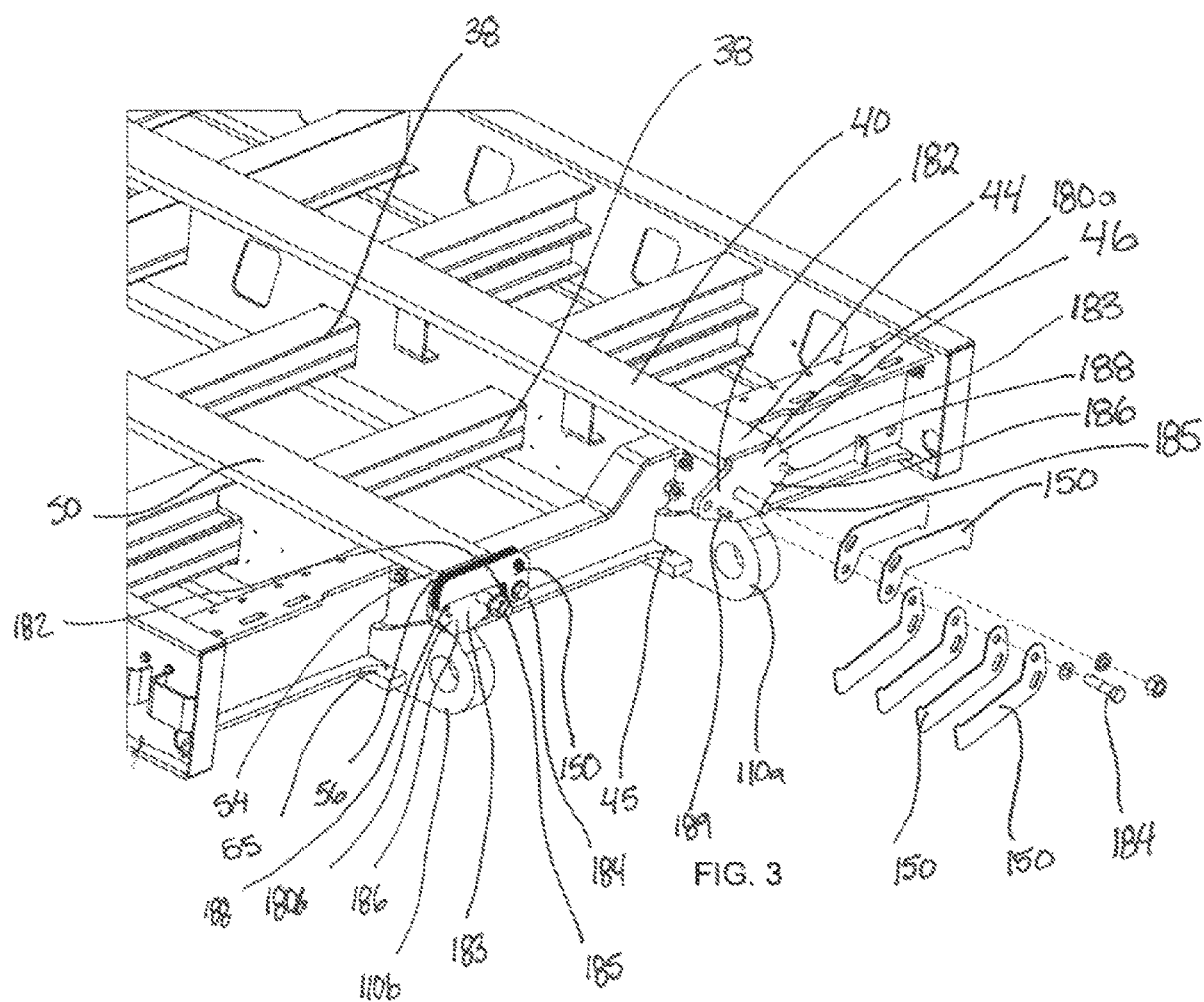
FIG. 3 is a rear schematic view of rear end of support beams in the deck assembly of a trailer and shim plates used to adjust the camber of the support beams.

Referring to FIGS. 1-3, the decking 32, 34, 36 can be supported by cross beams 38 that pass through the first support beam 40 and the second support beam 50. In this manner, the decking 32, 34, 36 is not connected to either the hitch assembly 20 portion of the trailer 10 or the axle assembly 80, allowing the first support beam 40 and the second support beam 50 to flex independently of the decking 32, 34, 36 which simply are carried by the first support beam 40 and second support beam 50.

The first support beam 40 and second support beam 50 can have a positive camber so that the first support beam 40 and the second support beam 50 arch upwards in the middle. In this manner, as the first support beam 40 and the second support beam 50 extend from their front ends 42, 52 to their rear ends 44, 54, respectively, the first support beam 40 and the second support beam 50 can curve first upwards and then back downwards so that the middle of the support beams 40, 50 arch or are displaced upwards.

By cambering the first support beam 40 and the second support beam 50, smaller beams can be used to support the same weight that larger straight beams would support. When the weight of the load is carried on the deck assembly 30, which is supported by the cambered support beams 40, 50, the weight of the load can cause the support beams 40, 50 to bend or deflect downwards. Because the first support beam 40 and the second support beam 50 are cambered upwards, this deflection downwards of the first support beam 40 and the second support beam 50 causes them to move towards being straight. The more the first support beam 40 and the second support beam 50 are cambered, the heavier the load that can be carried on the deck assembly 30 because the more the first support beam 40 and the second support beam 50 can deflect downwards and still be straight or slightly arched upwards.

Ideally, the amount of camber in the first support beam 40 and the second support beam 50 should be set based on the weight of the load to be carried on the deck assembly 30. Having the first support beam 40 and the second support beam 50 deflect until the first support beam 40 and the second support beam 50 are straight or just slightly arched upwards is ideal for carrying a load. In the trailer 10, a structural joint 100 can be provided between the deck assembly 30 and the axle assembly 80 to allow for the amount of camber in the support beams 40, 50 to be carried across into the axle assembly 80. The angle of this structural joint can be adjusted to be tailored to different load weights.

The structural joint 100 can be provided between the deck assembly 30 and the axle assembly 80. The axle assembly 80 can be provided behind the deck assembly 30 with the axle assembly 80 attaching to the rear end 44 of the first support beam 40 and the rear end 54 of the second support beam 50. The axle assembly 80 can include a pair of support rails 82, 84. A number of axles 90, 92, 94 can be supported from a first support rail 82 and a second support role 84. Each axle 90, 92, 94 supports wheels 96. For the trailer 10 shown in the figures, three axles 90, 92, 94 are shown, but this could be vary depending on the trailer. The axles 90, 92, 94 can be suspended from the first support rail 82 and the second support rail 84 by suspension, such as air bags, etc.

The axle assembly 80 and the axles 90, 92, 94 and wheels 96 support the trailer 10 and are used to carry the load positioned on the deck assembly 30 of the trailer 10.

Figure 4:
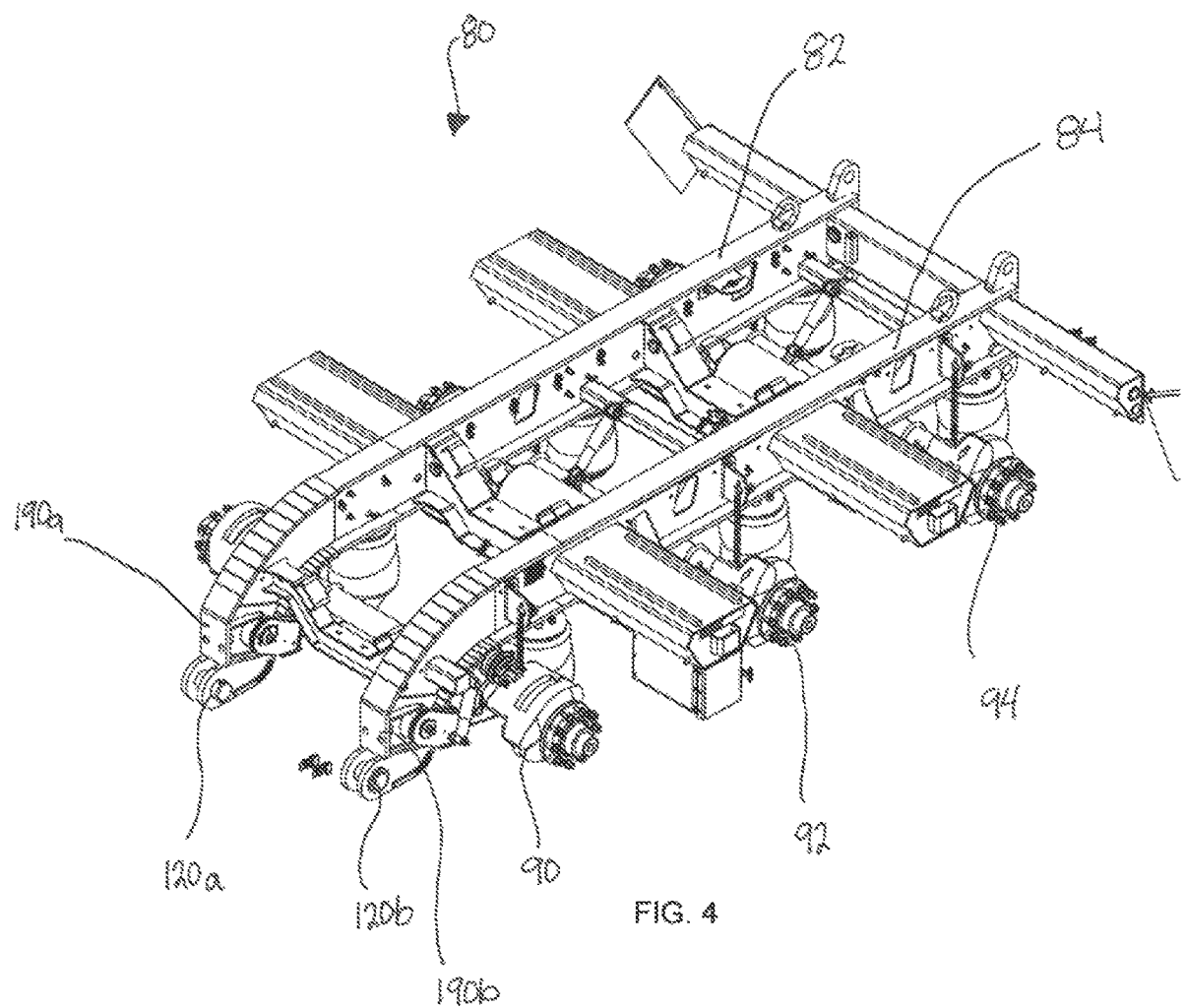
FIG. 4 is a front schematic view of a front end of axle assembly of a trailer.
Figure 5:
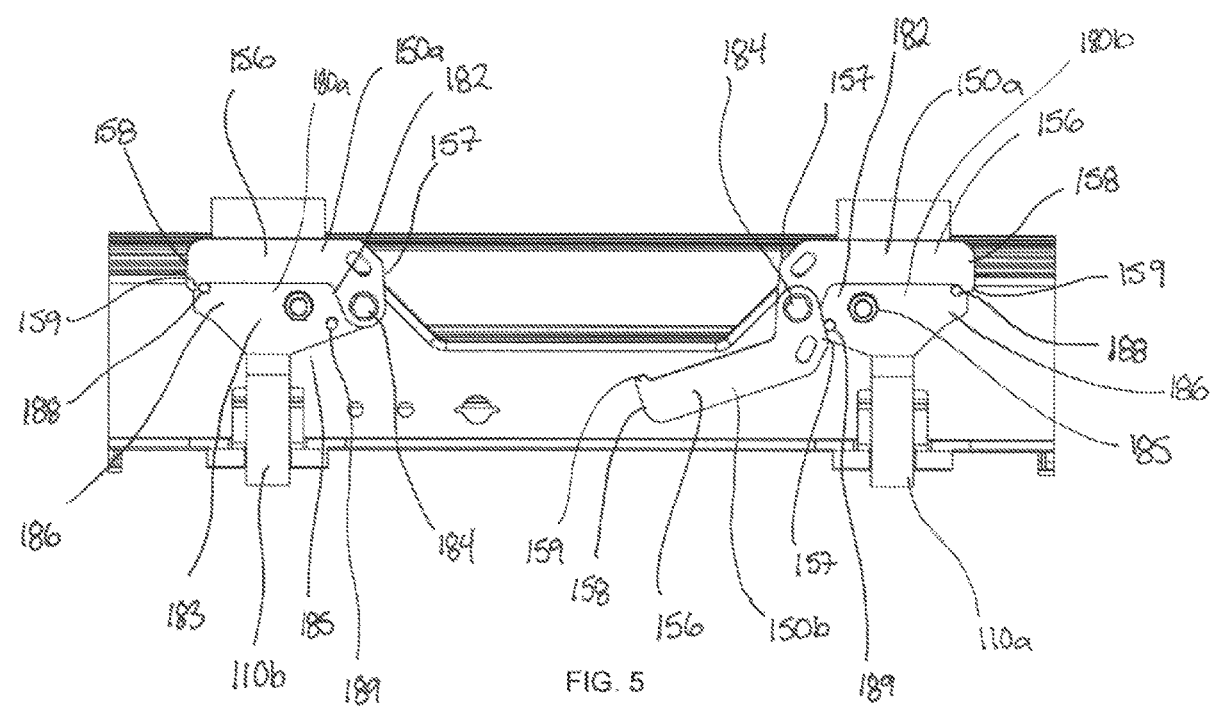
FIG. 5 is a perspective view of a shim plate in an joint position and another shim plane in a storage position.

The structural joint 100 can be formed by the rear end 44 of the first support beam 40 and the rear end 54 of the second support beam 50 being rotatably attached to the axle assembly 80. Referring to FIG. 3-5, the rear end 44 of the first support beam 40 can have a first pin joint hinge connection 110a that attaches to a first rotatable connection 120a on the first support rail 82 of the axle assembly 80. The first pin joint hinge connection 110a can be provided proximate a bottom 45 of the rear end 44 of the first support beam 40. The rear end 54 of the second support beam 50 can have a second pin joint hinge connection 110b that attaches to a second rotatable connection 120b on the second support rail 84 of the axle assembly 80. The second pin joint hinge connection 110b can be provided proximate a bottom 54 of the rear end 44 of the second support beam 50. In this manner, the rear axle assembly 80 can rotate relative to the rear ends 44, 54 of the support beams 40, 50.

Proximate a top 46 of the rear end 44 of the first support beam 40, a first connection flange 180a can be provided that aligns with a first connection plate 190a on the first support rail 82 of the axle assembly 80 and proximate a top 56 of the rear end 54 of the second support beam 50, a second connection flange 180b can be provided that aligns with a second connection plate 190b on the second support rail 84 of the axle assembly 80. Shim plates 150 can be provided between the connection flanges 180a, 180b and the connection plates 190a, 190b to adjust the amount of camber in the support beams 40, 50. To increase the camber of the first support beam 40 and the second support beam 50, more shims plates 150 can be added between the connection flanges 180a, 180b and the connection plate 190a, 190b.

When there are no shim plates 150 provided in between the connection flanges 180a, 180b and the connection plates 190a, 190b, the rear axle housing 80 can rotate around the pin joint hinge connections 110a, 110b at the bottoms 45, 55 of the rear ends 44, 54 of the support beams 40, 50. The first connection flange 180a on the first support beam 40 can be positioned against the first connection plate 190a on the axle assembly 80 and the second connection flange 180b on the second support beam 50 can be positioned against the second connection plate 190b on the axle assembly 80. This will result in the support beams 40, 50 only having as much camber as the support beams 40, 50 were constructed with.

When one or more shim plates 150 are provided in the structural joint 100, the shim plates 150 can be positioned between the connection flanges 180a, 180b and the connection plates 190a, 190b. As shim plates 150 are added between the connection flanges 180a, 180b and the connection plates 190a, 190b, the axle assembly 80 can rotate around the first pin joint hinge connection 110a and the second pin joint hinge connection 110b, increasing the angle between the deck assembly 30 and the axle assembly 80. The more shim plates 150 that are added between the connection flanges 180a, 180b and the connection plates 190a, 190b, the greater the angle between the deck assembly 30 and the axle assembly 80 and the more the first support beam 40 and the second support beam 50 are deflected and arch upwards.

The connection flanges 180a, 180b can each have: a first ear 182; a second ear 186; a main body 183; a use stop 188 extending from the second ear 186; a stowage stop 189 extending from the first ear 182; a pivot member 184 extending from the first ear 182; and a securing member 185 extending form the main body 183.

The main body 183 of the connection flange 180a, 180b can be sized to conform with the connection plate 190a, 190b, respectively, on the axle assembly 80 so that the main body can be positioned against to the connection plate 190a, 190b on the axle assembly 90 when there are no shim plate 150 positioned in between the connection flange 180a, 180b and the connection plate 190a, 190b, respectively.

The first ear 182 of the connection flange 180a, 180b can be positioned so that the first ear 182 extends from one side of the main body 183 of the connection flange 180a, 180b beyond the periphery of the connection plate 190a, 190b, respectively, on the axle assembly 80, so that the first ear 182 on the connection flange 180a, 180b does not come into contact with the connection plate 190a, 190b, just the main body 183, when the connection flange 180a, 180b is positioned against the connection plate 190a, 190b.

The second ear 186 of the connection flange 180a, 180b can also be positioned so that the second ear 186 extends from an other side of the main body 183 of the connection flange 180a, 180b beyond the periphery of the connection plate 190a, 190b, respectively, on the axle assembly 80, so that the second ear 186 on the connection flange 180a, 180b does not come into contact with the connection plate 190a, 190b, just the main body 183, when the connection flange 180a, 180b is positioned against the connection plate 190a, 190b.

The use stop 188 can be provided extending from the second ear 186 of the connection flange 180a, 180b to hold the shim plate 150 in a joint position across the connection flange 180a, 180b when the shim plate 150 is being used as a spacer. A stowage stop 189 can be provided extending from the first ear 182 to hold the shim plate 150 in a storage position when the shim plate 150 is not needed as a spacer in the structural joint 100.

The pivot member 184 can extend from the first ear 182 and be used to rotatably attach the shim plates 150 to the connection flange 180a, 180b. In one aspect, this pivot member 184 can be a bolt and nut. The securing member 185 can extend from the main body 183 and be used to secure the structural joint 100 closed with the desired shim plates 180 positioned in between to use the trailer 10 with the desired camber. In one aspect, this securing member 185 can be a bolt and nut.

Figure 6:
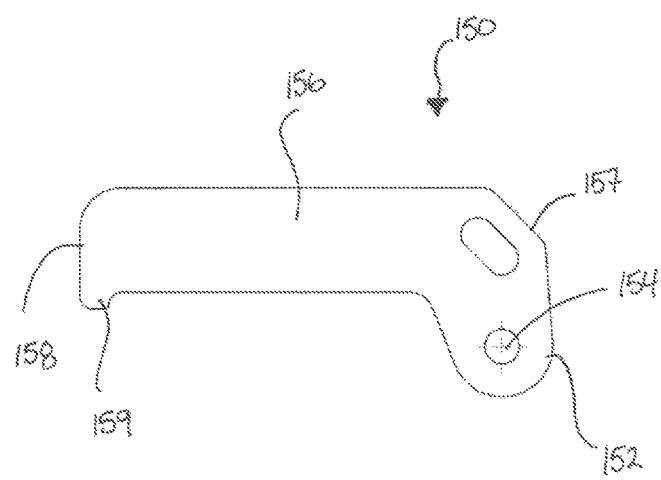
FIG. 6 is a front view of a shim plate in a joint position.
Figure 7:
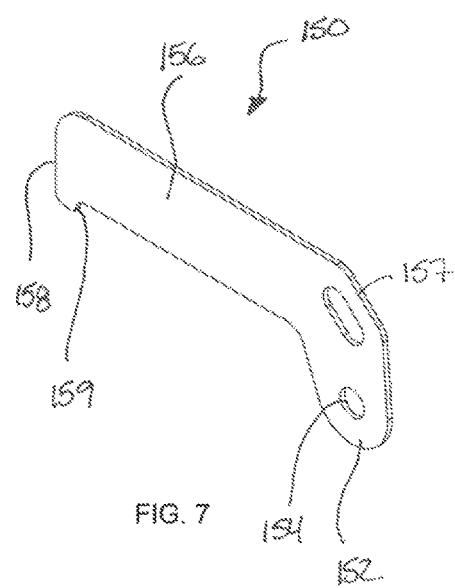
FIG. 7 is a perspective view of the shim plate, shown in FIG. 6, in a storage position.

Referring to FIGS. 6 and 7, each shim plate 150 can have a connecting flange 152 with an aperture 154 passing through the connecting flange 152. The aperture 154 allows the shim plate 150 to be rotatably connected to the connection flange 180. A spacing member 156 can extend from a first end 157 at the connecting flange 152 to a second end 158 of the spacing member 156 having a nub 159.

Referring again to FIG. 3, a plurality of shim plates 150 can be rotatably attached to each connection flange 180a, 180b on the first ear 182 of the connection flange 180a, 180b, so that the shim plates 150 can be selectively rotated in between the connection flange 180a, 180b and the connection plate 190a, 190b, respectively. The pivot member 184 can be positioned passing through the aperture 154 in the connecting flange 152 of each shim plate 150 provided on the connection flange 180a, 180b. In this manner, each shim plates 150 can be rotated around the pivot member 184 extending from the first ear 182 of the connection flange 180a, 180b between the joint position, where it will act as a spacer, and the storage position, where it will not act as a spacer in the structural joint 100.

Referring to FIG. 5, each shim plate 150a, 150b can be rotated around the pivot member 184 into the joint position. Shims 150a are shown in the joint position, where the spacing member 156 extends across the connection flange 180a, 180b with the spacing member 156 supported at its second end 158 on the use stop 188 so that the shim plate 150a is held in the joint position with the spacing member 156 extending across the connection flange 180a, 180b and in between the connection flange 180a, 180b and the connection plate 190a, 190b, respectively, to act as a spacer in the structural joint 100. Shim plate 150b is shown rotated around the pivot member 184 to the storage position, where the spacing member 156 of the shim plate 150 does not extend across the connection flange 180a so the spacing member 156 is not positioned between the connection flange 180a, 180b and the connection plate 190a, 190b. The shim plate 150 can be rotated around the spacing member 156 so that the shim plate 150 comes into contact with the stowage stop 189, which can support the shim plate 150 in this storage position and keep the shim plate 150 from swinging around when the trailer 10 is in transit.

In operation, an operator can adjust the camber of the first support beam 40 and the second support beam 50 and therefore the deck assembly 20, using the shim plate 150. When the operator learns the weight of the load to be carried on the deck assembly 20 and then decides how much camber he or she would like in the support beams 40, 50 in the bed assembly 20 of the trailer 10, the operator can select how many of the shim plates 150 must be positioned between the first connection flange 180a and the first connecting plate 190a on the axle assembly 80 to get the desired spacing between the first connection flange 180a and the first connection plate 190a to achieve the desired camber in the first support beam 40 and how many of the shim plates 150 must be positioned between the second connection flange 180b and the second connecting plate 190b on the axle assembly 80 to get the desired spacing between the second connection flange 180b and the second connection plate 190b to achieve the desired camber in the second support beam 50.

A nut (if the securing member 185 is a bolt and a nut) can be removed so that the securing member 185 is no longer securing the structural joint 100 together and the bed assembly 20 can pivot relative to the axle assembly 80 around the pin joint hinge connections 110a, 110b. The rear ends 44, 54 of the support beams 40, 50 can then be jacked up so that the axle assembly 80 pivots around the pin joint hinge connections 110a, 110b causing the connection flanges 180a, 180b and the connection plates 190a, 190b to separate and move away from one another to form a spacing in between the connection flanges 180a, 180b and their respective connection plates 190a, 190b.

The desired numbers of shim plates 150 can then be rotated from their storage position to the joint position between the separated connection flanges 180a, 180b and connection plates 190a, 190b to act as spacers. Each shim plate 150 can be rotated around the pivot member 184, from the storage position, where it is resting on the stowage stop 189, until the spacing member 156 of the shim plate 150 is running across the main body 183 of the connection flanges 180a, 180b and resting on the use stop 188 in the joint position.

The desired number of shim plates 150 can be moved into the joint position until the desired spacing is achieved between the connection flanges 180a, 180b and the connection plates 190a, 190b and the desired camber of the support beams 40, 50 obtained. When the desired number of shim plates 150 are placed in their joint position to achieve the desired spacing, the rear ends 44, 54 of the support beams 40, 50 can be lowered so that the axle assembly 80 rotates around the pin joint hinge connections 110a, 110b pressing the connection plates 190a, 190b against the plate shims 150 that are in their joint position. The securing member 185 can then be used to secure the structural joint 100, with the connection plates 190a, 190b secured in place against the shim plates 150 in their joint positions.

When the trailer 10 is lowered back onto the ground, the increased angle between the deck assembly 20 and the axle assembly 80 because of the shim plates 150 acting as spacers in the structural joint 100, will increase the camber in the support beams 40, 50. The more shim plates 150 that are added, the larger the spacing between the connection flanges 180a, 180b on the rear ends 44, 54 of the support beams 40, 50 and the connection plate 190a, 190b on the axle assembly 80. The larger this spacing, the more camber that is added to the support beams 40, 50.

In this manner, the camber in the support beams 40, 50 and therefore the bed assembly 20 can be adjusted to the desired amount for the load to be supported on the bed assembly 20 by the amount of shim plates 150 used as spacers.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A trailer comprising:
    a hitch assembly connectable to a tow vehicle;
    a deck assembly comprising:
        a first support beam, a front end of the first support beam attached to the hitch assembly, and a rear end of the first support beam connected to a structural joint;
        a second support beam, a front end of the second support beam attached to the hitch assembly, and a rear end of the second support beam connected to a structural joint; and
        decking supported by the first support beam and the second support beam,
        wherein the first support beam and the second support beam have a positive camber;
    an axle assembly having at least one axle and wheels provided on the at least one axle;
    the structural joint positioned between the deck assembly and the axle assembly; and
    at least one shim plate rotatable between a joint position, wherein the at least one shim plate is positioned in the structural joint, and a storage position, wherein the at least one shim plate is rotated out of the structural joint.

2. The trailer of claim 1 wherein the first support beam is parallel to the second support beam.

3. The trailer of claim 1 wherein the structural joint comprises a rotatable connection, the rotatable connection rotatably connecting a bottom of the rear end of the first support beam and a bottom of the rear end of the second support beam to the axle assembly.

4. The trailer of claim 3 wherein the structural joint further comprises: a first connection flange provided proximate a top of the rear end of the first support beam; a second connection flange provided proximate a top of the rear of the second support beam; a first connection plate provided on the axle assembly corresponding to the first connection flange; and a second connection plate provided on the axle assembly corresponding to the second connection flange.

5. The trailer of claim 4 wherein a first shim plate is rotatable between a joint position with the first shim plate positioned between the first connection flange and the first connection plate, and a storage position with the first shim plate rotated out from between the first connection flange and the first connection plate, and wherein a second shim plate is rotatable between a joint position with the second shim plate positioned in between the second connection flange and the second connection plate, and a storage position with the second shim plate rotated out from between the second connection flange and the second connection plate.

6. The trailer of claim 5 wherein the first connection flange comprises: a first ear; a second ear; and a main body.

7. The trailer of claim 6 wherein the first ear of the first connection flange extends from one side of the main body of the first connection flange beyond a periphery of the first connection plate on the axle assembly when the first connection flange is positioned against the first connection plate.

8. The trailer of claim 7 wherein the second ear of the first connection flange extends from an other side of the main body of the first connection flange beyond a periphery of the first connection plate on the axle assembly when the first connection flange is positioned against the first connection plate.

9. The trailer of claim 8 further comprising a use stop extending from the second ear of the first connection flange, wherein the use stop holds the at least one shim plate in the joint position when the at least one shim plate is used as a spacer in the structural joint.

10. The trailer of claim 9 further comprising a stowage stop extending from the first ear of the first connection flange, wherein the stowage stop holds the at least one shim plate in the storage position.

11. The trailer of claim 8 further comprising a pivot member extending from the first ear of the first connection flange, the at least one shim plate rotatably attached to the first connection flange by the pivot member.

12. The trailer of claim 8 further comprising a securing member extending from the main body of the first connection flange, the securing member securing the structural joint closed.

13. The trailer of claim 12 wherein the securing member is a bolt and a nut.

14. The trailer of claim 1 wherein the at least one shim plate comprises:
    a connecting flange having an aperture passing through the connecting flange; and
    a spacing member extending from a first end attached to the connecting flange to a second end.

15. The trailer of claim 14 wherein the at least one shim plate further comprises a nub provided on the second end of the spacing member.

16. The trailer of claim 4 wherein the at least one shim plate is rotatably connected to the first connection flange by a pivot member passing through an aperture in the at least one shim plate.

17. The trailer of claim 16 wherein the at least one shim plate is selectively rotated around the pivot member between the joint position and the storage position.

18. The trailer of claim 1 wherein the decking comprises: middle decking suspended between the first support beam and the second support beam; outboard decking suspended outside the first support beam and the second support beam; first outboard decking supported by the first support beam and the second support beam outside the first support beam on a first side; and second outboard decking supported by the first support beam and the second support beam outside the second support beam on a second side.

19. The trailer of claim 18 wherein the middle decking, first outboard decking and second outboard decking are supported by cross beams that pass through the first support beam and the second support beam.

20. The trailer of claim 4 wherein the axle assembly comprises a first support rail and a second support rail, the at least one axle suspended from the first support rail and the second support rail.

21. The trailer of claim 20 wherein a first connection plate is provided on the first support rail and a second connection plate is provided on the second support rail.

22. The trailer of claim 4 wherein adding more shim plates between the connection flange and the connection plate will increase the camber in the support beams.

\* \* \* \* \*